(No Model.)  2 Sheets—Sheet 1.
B. KUHNS.
COMBINED SEEDER AND FERTILIZER DISTRIBUTER.
No. 262,435.  Patented Aug. 8, 1882.
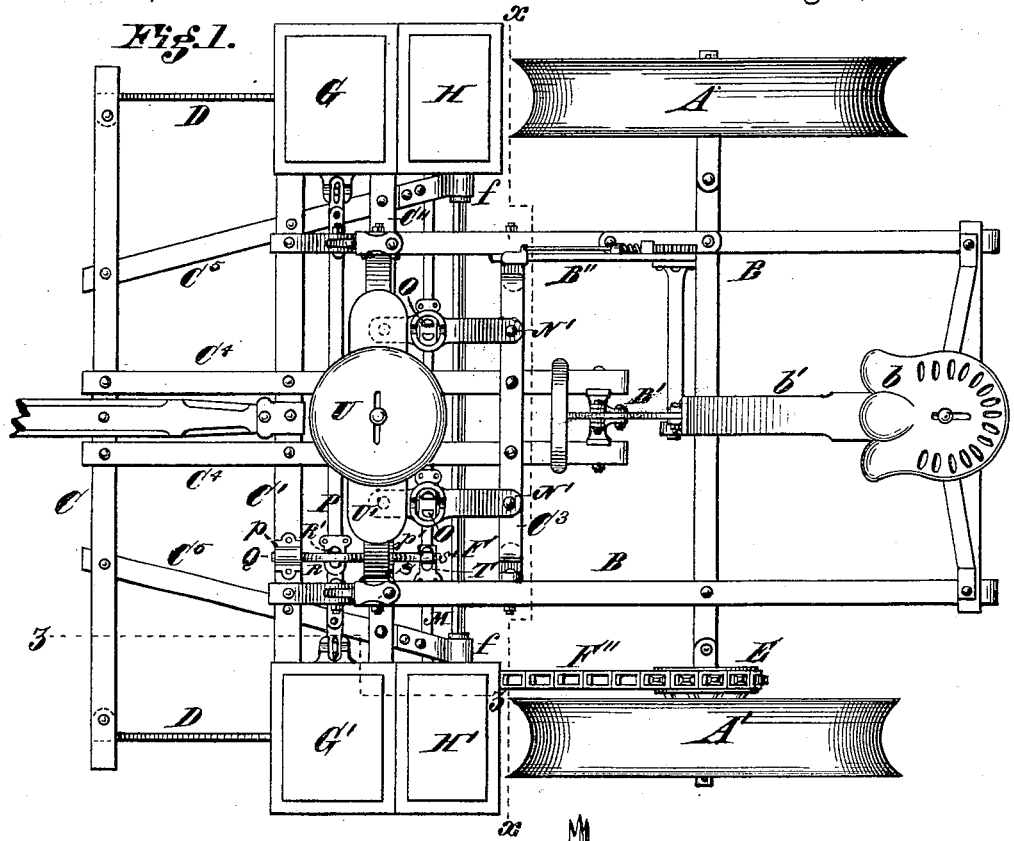
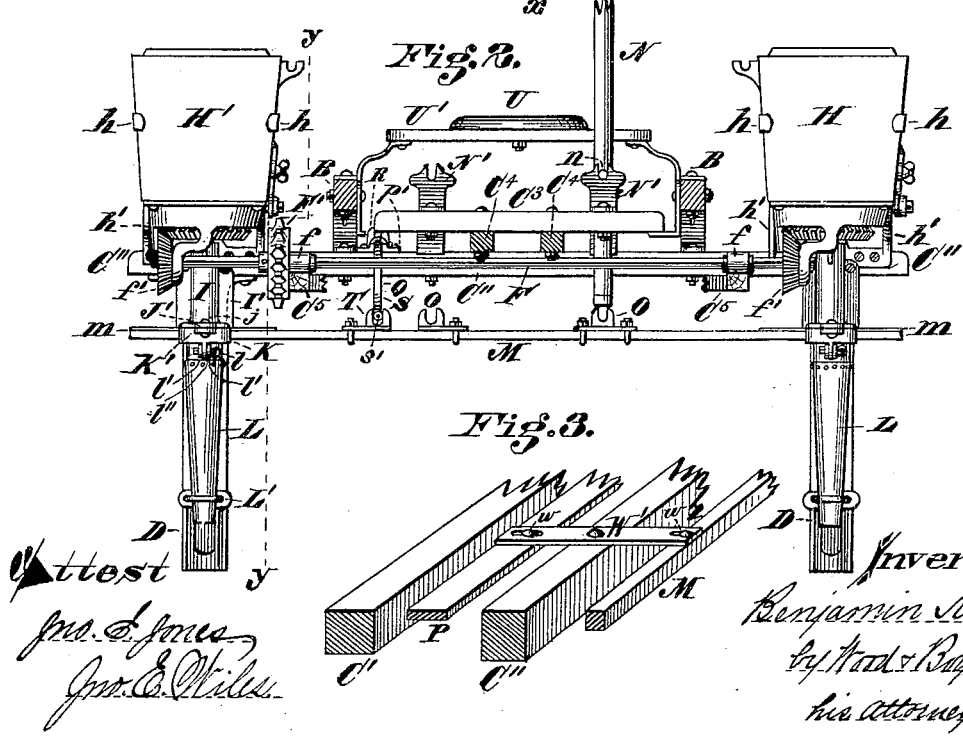
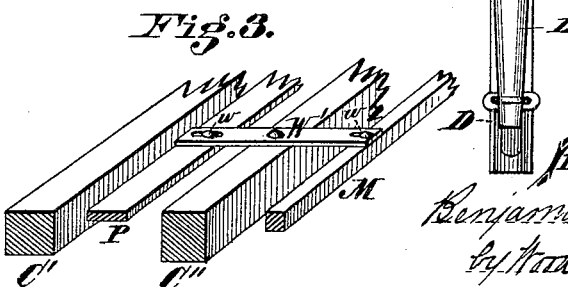
Attest  Inventor
Jno. L. Jones  Benjamin Kuhns
Jno. E. Wiles  by Ward & Boyd
  his attorneys (No Model.) 2 Sheets—Sheet 2.
B. KUHNS.
COMBINED SEEDER AND FERTILIZER DISTRIBUTER.
No. 262,435. Patented Aug. 8, 1882.
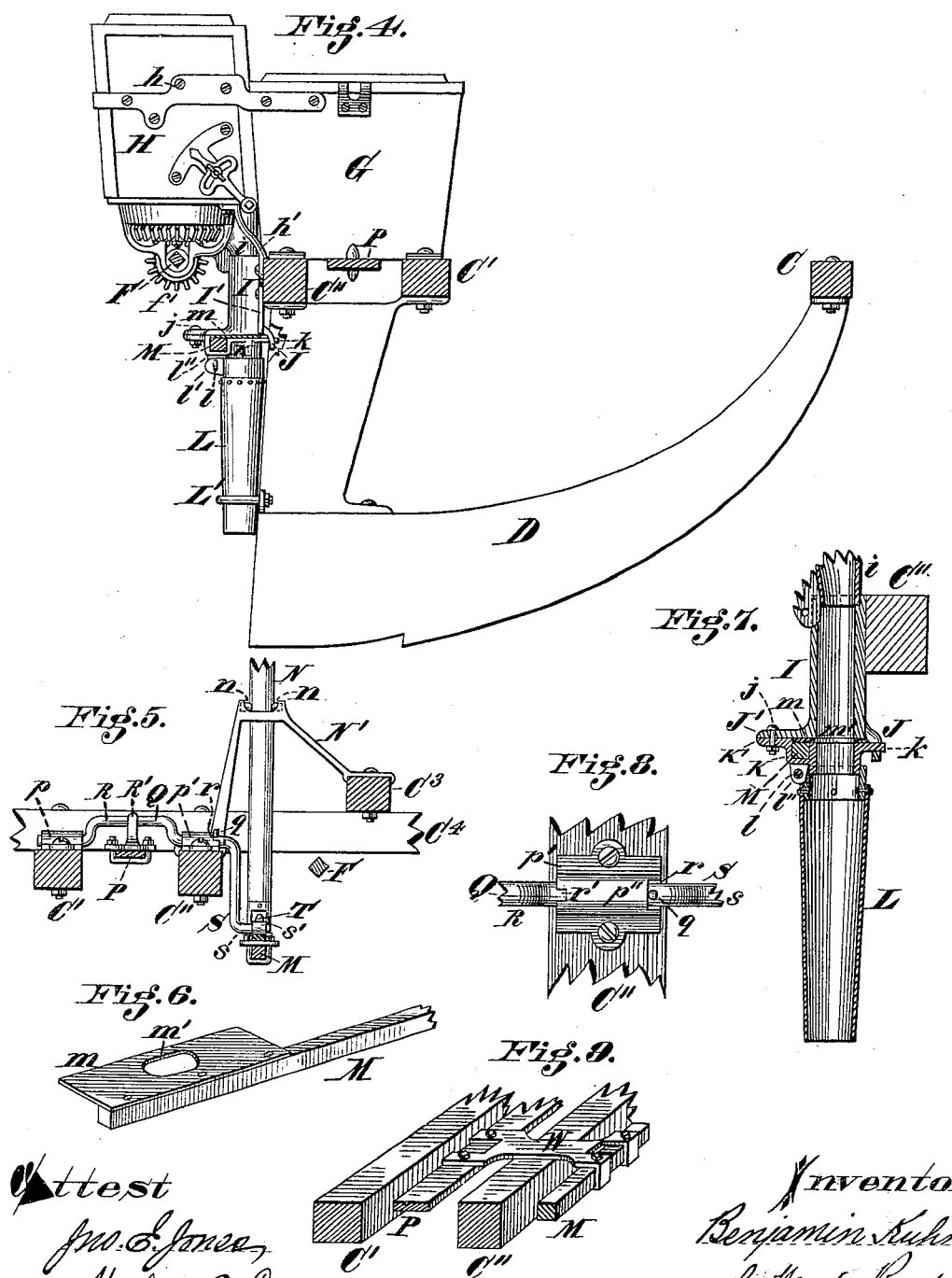

UNITED STATES PATENT OFFICE.

BENJAMIN KUHNS, OF DAYTON, OHIO.

COMBINED SEEDER AND FERTILIZER-DISTRIBUTER.

SPECIFICATION forming part of Letters Patent No. 262,435, dated August 8, 1882.

Application filed June 14, 1882. (No model.)

*To all whom it may concern:*

Be it known that I, BENJAMIN KUHNS, a citizen of the United States, and a resident of Dayton, in the county of Montgomery and State of Ohio, have invented certain new and useful Improvements in a Combined Seeder and Fertilizer-Distributer, of which the following is a specification.

My invention relates to a combined seeder and fertilizer-distributer.

The object of my invention is to provide novel means for connecting the dropper devices of a corn-planter when it is used either as a check-row planter or as a drilling-planter with a fertilizer-distributer, so as to operate them simultaneously or independently by a pivoted dropper-lever or other suitable actuating means, and thereby adapt the machine to either drilling or intermittently dropping the fertilizer with the grain, as desired, and which can be used for drilling the fertilizer when the corn is being drilled, all of which will be more fully hereinafter described.

Another object of my invention is to provide, in connection with the fertilizer-feeding devices, a reciprocating cut-off bar so mounted and operating in the discharge-spouts thereof as to drill or intermittently cut off the fertilizing material and serve as a scraper to keep the openings clear and clean.

Another object of my invention is to provide novel means for detachably securing the fertilizer-discharge spouts to the conducting-tubes from the hoppers, so as to readily attach or detach the cut-off devices operating in connection therewith.

Other features of my invention will be fully set forth in the following description of the accompanying drawings, in which—

Figure 1 is a plan view of a combined corn-planter and fertilizer-distributer embodying my invention. Fig. 2 is a rear transverse sectional elevation on the line *x x*, Fig. 1. Fig. 3 is a perspective view of a section of a runner-frame and reciprocating seeder and fertilizer bars, showing a modified form of connecting device for operating both seeder and fertilizer mechanisms in unison by a single lever. Fig. 4 is a sectional elevation on line *y y*, Fig. 2, and *z z*, Fig. 1. Fig. 5 is a broken cross-sectional elevation of the runner-frame, showing the arrangement and construction of the double-crank shaft and its driving-connection of the seeder and fertilizer devices. Fig. 6 is a perspective view of one end of the reciprocating fertilizer-dropper bar, showing one of the cut-off-valve plates mounted thereon. Fig. 7 is a central sectional elevation of one of the fertilizer drop or discharge tubes, showing the manner of detachably securing its several parts or sections together and the sliding cut-off in position for feeding or discharging the fertilizer. Fig. 8 is a detail view in plan of of the detachable journal-box top plate whereby the double-crank shaft may oscillate for the dropping operation or be locked in position for the drilling operation. Fig. 9 is a perspective view of a section of the runner-frame, reciprocating seeder-bar, and one fertilizer-dropper bar, showing a modified form of connecting the fertilizer cut-off valves with the reciprocating seeder-bar.

A A' represent the supporting-wheels of a corn-planter; B, the riding or main frame, and C C' C'' C³ C⁴ C⁵ the parts composing the runner-frame, connected to the main frame and mounted on the runners D D in the usual manner.

*b* represents the driver's seat, mounted on the seat-standard *b'*.

B' B'' represent the foot and hand lever devices for operating the runner-frame, constructed and operating as customary, which will be unnecessary for me to describe herein.

E represents a sprocket-wheel attached to and driven by the ground-wheel A'.

F is a transverse shaft, mounted in suitable journal-bearings, *f*, on the ends of hounds or bars C⁵ of the runner-frame, and having at its ends bevel gears or pinions *f'*, which drive the fertilizer-dropping devices.

F' is a sprocket-wheel rigidly mounted on the shaft F, and connecting by a drive-chain, F'', with sprocket-wheel E, by which to rotate shaft F.

G G' represent the grain-hoppers, mounted, as customary, on the runner-beams C' C''.

H H' represent the fertilizer-hoppers secured to the backs of hoppers G G', preferably by straps *h*, being supported by brackets *h'*, secured to the runner-beam C'', as shown in Figs. 2 and 4.

Any suitable form of fertilizer-dropping devices may be employed, which are secured to or in the bottom of hoppers H H'.

I represents the fertilizer-conducting tubes, having flanges I', by which they are secured to the runner-frame C''. The upper ends of conductors I fit over discharge-orifices $i$ of the distributer-cups.

J is a loop-lug at the forward lower end of conductor I.

J' is a flange on the rear lower end of conductor I, opposite said lug J.

K represents a coupling or intermediate frame or box, by which to detachably secure the spout L to the conductor I, and for another purpose hereinafter described. Box K is constructed with an orifice or opening the counterpart of that of conductor I, and is provided with a lug, $k$, at its forward upper end, which is seated in the loop-lug J, and a flange, K', by which it is secured to the bottom of conductor I by means of a bolt, $j$, passing through eyes made in the said flanges J' K'.

The spout L is detachably secured to the box K, preferably by a spring nail or bolt, $l$, passing through eyes made in lugs $l'$ $l'$ $l''$, and is rigidly held in position by a loop, L', secured to the heels of the runner D, as shown in Figs. 2 and 4.

M represents a transversely-reciprocating dropper-bar, having very thin cut-off-valve plates $m$ mounted at or near its ends, which slide back and forth in the spaces or slits between the tops of coupling-boxes K and the bottoms of conductors I, the bar M being mounted and sliding in suitable ways or bearings made in the coupling-boxes K. The boxes K and spouts L, being detachably secured to the conductors I, permit the ready attachment and detachment of the cut-off bar M $m$ $m$, as desired.

$m'$ $m'$ represent discharge openings or orifices made in the cut-off plates $m$. The cut-off plates $m$ being constructed of very thin metal, their operation is very effective in keeping the spout-openings clear and cutting off the discharge, with no liability of the orifices $m'$ becoming choked or clogged up, which would be more liable to occur if very heavy metal were employed.

Instead of the continuous transversely-reciprocating bar M, the cut-off valves may be connected directly to the reciprocating bar of the planter by any convenient device, such as is shown in Fig. 9, where a yoke, W, is secured at its opposite ends to the seeder-bar and to short bars M, on which the cut-off-valve plates are secured, and the same results obtained.

N represents a hand-dropper lever by which the bar M is reciprocated. It is pivoted by studs or pins $n$ in either of the upright bracket-bearings N' N', which are secured to runner-beams C'' C³, and rests at its lower end in an upright fork, O, adjustably secured to bar M.

P represents the seed-dropper bar arranged and connected with the dropping mechanism, as customary in double-row corn-planters.

Q represents a double-crank shaft journaled in boxes $p$ $p'$, secured to the runner-beams C' C'', and connecting the dropping devices of the seeder and fertilizer-distributer.

R represents the crank-arm of shaft Q, that operates the seeder-bar P. It rests in the fork R', which is secured to the said bar P.

S represents the depending or vertical crank-arm of shaft Q. Its lower end, $s$, having a friction-roller, $s'$, rests in a fork, T, secured to the bar M, by which it is oscillated.

The top plate, $p''$, of the journal-box $p'$ is detachably secured in position, and is constructed with a wide notch or gain, $r$, at one end, in which the stop or pin $q$, set in the crank-shaft Q, moves and limits the swinging movement of said shaft during the dropping or checking operation of the machine.

When it is desired to drill the fertilizer and check-row the corn the fork R' on the seeder-bar is detached, also the plate $p''$, and its position reversed on the shaft Q, so that the pin $q$ will rest firmly in the narrow notch $r'$, made in the end opposite to notch $r$, and thereby lock the crank-shaft Q and its depending crank-arm S, engaging the cut-off bar M with the opening $m'$, in position for discharging, as shown in Fig. 7.

U represents the dropper's seat, adjustably secured, as customary, on the upright cross-standard U', which is secured so as to be adjustable vertically on the forward end of frame B.

Instead of the hand dropper-levers N used in connection with the bar M, it or the customary seeder-dropper lever may be used in connection with the seeder-bar P to operate the dropping devices of both mechanisms.

Instead of either of the hand-levers above mentioned, power communicated from one of the driving or supporting wheels by a chain or other well-known means to either the bar M or seeder-bar P could be employed and the machine operate with like effect.

Instead of employing the crank-shaft Q to connect the two reciprocating dropper-bars M and P, an inferior modified form, such as is shown in Fig. 3, would accomplish the same result. The two bars would then be arranged on the same level or horizontal plane and connected so as to operate in unison by a pivoted yoke or bar, W', slotted at its ends, through which slots pass bolts $w$ $w$, detachably securing it in position, so as to adapt either of the two bars to operate independently, if desired.

I do not desire to limit myself to the specific form of devices herein mentioned, as various mechanical equivalents could be substituted without affecting the material features of my invention.

The hand dropper-lever can be connected at any convenient point of said reciprocating mechanism.

I claim—

1. In a double-row corn-planter, the combination of two kinds of dropping devices, one adapted to drop corn and the other to drill fertilizing material, both dropping devices being mounted on the frame of the planter and connected, whereby the same driving mechanism is adapted to plant the seed and drill the fertilizing material simultaneously in either drills or check-rows.

2. In a double-row corn-planter, the combination of two kinds of dropping devices, one adapted to drop corn and the other to automatically drill fertilizing material, both dropping devices being mounted on the frame of the planter and connected, whereby the same driving mechanism is adapted to plant the seed and drill the fertilizing material.

3. In a double-row corn-planter, the combination of two kinds of dropping devices, one adapted to drop corn and the other to continuously drill fertilizing material, both dropping devices being mounted on the frame of the planter and operated by the same driving mechanism for depositing the seed and continuously drilling the fertilizing material while checking.

4. In a double-row corn-planter, the combination of two kinds of dropping devices, one adapted to drop corn and the other to continuously drill fertilizing material, both dropping devices being mounted on the frame of the planter and operated by the same driving mechanism for depositing the seed and continuously drilling the fertilizing material between the check-rows while checking.

5. A combined double-row corn-planter and fertilizer-drill attached to and mounted on the frame of the planter, the dropping mechanisms of each being connected with the driving mechanism of the planter, whereby one of the droppers will operate as a drill and the other as a check-rower.

6. In a double-row corn-planter, the combination of two kinds of dropping devices, one for dropping corn and the other for drilling fertilizing material, with a chamber having a suitable cut-off valve or slide below each fertilizer-dropping device for receiving and holding the fertilizing material preparatory to discharging it in check-rows.

7. In a double-row corn-planter, the combination of two kinds of dropping devices, one for dropping corn and the other for drilling fertilizing material, both dropping devices being mounted on the frame of the planter and connected by the same driving mechanism, with cut-off valves or slides and a chamber intermediate of the fertilizer-dropping devices and valves for receiving and holding the fertilizing material preparatory to discharging it in check-rows.

8. In a corn-planter having combined in its construction fertilizer-distributer mechanism with the seeding devices, the two being connected together by a crank-shaft and lever mounted in bearings $p$ $p'$, or their described equivalents, and adapted to operate the seeder-bar P and the fertilizer cut-off M $m$ $m'$ simultaneously or independently, substantially as and for the purpose specified.

9. In a corn-planter, the crank-shaft Q, having pin $q$ and mounted in journal-bearings $p$ $p'$, the bearing $p'$ being provided with a top plate, $p''$, having notches or slots $r$ $r'$, in which pin $q$ either oscillates or rests for the check-rowing or drilling operation of the machine, substantially as herein set forth.

10. The fertilizer-discharge spouts composed of the parts I J J' L, attached to the runner-frame and detachably secured together by the coupling-spout box K K' $k$, and having an intermediate slot or opening, in which the cut-off M $m$ $m'$ operates, substantially as herein set forth.

In testimony whereof I have hereunto set my hand in the presence of two subscribing witnesses.

BENJAMIN KUHNS.

Witnesses:
HARRY H. PRUGH,
WARREN MUNGER.